US009251064B2

(12) United States Patent
Kimmel

(10) Patent No.: US 9,251,064 B2
(45) **Date of Patent: *Feb. 2, 2016**

(54) NVRAM CACHING AND LOGGING IN A STORAGE SYSTEM

(71) Applicant: NetApp, Inc., Sunnyvale, CA (US)

(72) Inventor: Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,302

(22) Filed: Jan. 8, 2014

(65) Prior Publication Data

US 2015/0193337 A1 Jul. 9, 2015

(51) Int. Cl.

| | |
|---|---|
| ***G06F 12/00*** | (2006.01) |
| ***G06F 12/02*** | (2006.01) |
| ***G06F 12/08*** | (2006.01) |
| ***G06F 3/06*** | (2006.01) |

(52) U.S. Cl.

CPC .......... *G06F 12/0246* (2013.01); *G06F 3/0614* (2013.01); *G06F 3/0655* (2013.01); *G06F 3/0679* (2013.01); *G06F 3/0688* (2013.01); *G06F 12/0802* (2013.01); *G06F 12/0804* (2013.01); *G06F 12/0815* (2013.01); *G06F 12/0866* (2013.01); *G06F 12/0891* (2013.01); *G06F 12/0893* (2013.01); *G06F 12/0895* (2013.01); *G06F 2212/1032* (2013.01); *G06F 2212/214* (2013.01); *G06F 2212/221* (2013.01); *G06F 2212/2228* (2013.01)

(58) Field of Classification Search

CPC . G06F 3/0679; G06F 3/0688; G06F 12/0893; G06F 12/0895; G06F 12/0802; G06F 12/0891; G06F 12/0246

USPC .................................................. 711/103, 143

See application file for complete search history.

(56) References Cited

U.S. PATENT DOCUMENTS

| | | | | |
|---|---|---|---|---|
| 5,937,425 | A | 8/1999 | Ban | |
| 7,249,150 | B1 | 7/2007 | Watanabe et al. | |
| 7,680,837 | B2 | 3/2010 | Yamato | |
| 7,996,636 | B1 | 8/2011 | Prakash et al. | |
| 8,082,390 | B1 | 12/2011 | Fan et al. | |
| 8,099,396 | B1 | 1/2012 | Novick et al. | |
| 8,099,554 | B1 * | 1/2012 | Solomon et al. | 711/118 |
| 8,205,065 | B2 | 6/2012 | Matze | |
| 8,341,457 | B2 | 12/2012 | Spry et al. | |

(Continued)

OTHER PUBLICATIONS

Cornwall, Michael, "Anatomy of a Solid-state Drive," ACM Queue—Networks, vol. 10, No. 10, Oct. 2012, pp. 1-7.

(Continued)

*Primary Examiner* — Prasith Thammavong

(74) *Attorney, Agent, or Firm* — Cesari and McKenna, LLP

(57) ABSTRACT

In one embodiment, a node coupled to one or more solid state drives (SSDs) executes a storage input/output (I/O) stack having a plurality of layers, including a persistence layer. The node includes a non-volatile random access memory (NVRAM). A portion of the NVRAM is configured as a write-back cache to store write data associated with one or more write requests. The persistence layer is configured to organize the write data into extents that are written back to the one or more SSDs in any order. The write data is preserved in the write-back cache until each extent is safely and successfully stored on the one or more SSDs in an event of a power loss.

18 Claims, 8 Drawing Sheets

(56) References Cited

U.S. PATENT DOCUMENTS

| | | | | |
|---|---|---|---|---|
| 8,417,987 | B1 | 4/2013 | Goel et al. | |
| 8,495,417 | B2 | 7/2013 | Jernigan, IV et al. | |
| 8,539,008 | B2 * | 9/2013 | Faith et al. | 707/822 |
| 8,560,879 | B1 | 10/2013 | Goel | |
| 8,583,865 | B1 * | 11/2013 | Sade et al. | 711/113 |
| 8,595,595 | B1 | 11/2013 | Grcanac et al. | |
| 8,806,115 | B1 * | 8/2014 | Patel et al. | 711/103 |
| 2003/0105928 | A1 * | 6/2003 | Ash et al. | 711/136 |
| 2003/0120869 | A1 | 6/2003 | Lee et al. | |
| 2003/0135729 | A1 | 7/2003 | Mason et al. | |
| 2003/0200388 | A1 * | 10/2003 | Hetrick | 711/114 |
| 2005/0144514 | A1 | 6/2005 | Ulrich et al. | |
| 2006/0004957 | A1 * | 1/2006 | Hand et al. | 711/113 |
| 2007/0033433 | A1 * | 2/2007 | Pecone et al. | 714/6 |
| 2007/0143359 | A1 | 6/2007 | Uppala | |
| 2009/0083478 | A1 | 3/2009 | Kunimatsu et al. | |
| 2009/0132770 | A1 | 5/2009 | Lin | |
| 2010/0042790 | A1 | 2/2010 | Mondal et al. | |
| 2010/0088296 | A1 | 4/2010 | Periyagaram et al. | |
| 2010/0205353 | A1 | 8/2010 | Miyamoto et al. | |
| 2011/0035548 | A1 | 2/2011 | Kimmel et al. | |
| 2011/0191522 | A1 | 8/2011 | Condict et al. | |
| 2011/0213928 | A1 | 9/2011 | Grube et al. | |
| 2012/0239869 | A1 | 9/2012 | Chiueh et al. | |
| 2012/0246392 | A1 * | 9/2012 | Cheon | 711/103 |
| 2012/0290788 | A1 | 11/2012 | Klemm et al. | |
| 2013/0018854 | A1 | 1/2013 | Condict | |
| 2013/0138862 | A1 | 5/2013 | Motwani et al. | |
| 2013/0238832 | A1 | 9/2013 | Dronamraju et al. | |
| 2013/0238932 | A1 | 9/2013 | Resch | |
| 2013/0268497 | A1 | 10/2013 | Baldwin et al. | |
| 2013/0346810 | A1 | 12/2013 | Kimmel et al. | |

OTHER PUBLICATIONS

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Leventhal, Adam H. "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the 23$^{rd}$ ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the 13$^{th}$ ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

PCT Notification of Transmittal of the International Search Report and the Written Opinion of the International Searching Authority, or the Declaration, International Searching Authority, International Application No. PCT/US2014/071581, mailed Apr. 10, 2015, 9 pages.

* cited by examiner

NVRAM CACHING AND LOGGING IN A STORAGE SYSTEM

BACKGROUND

1. Technical Field

The present disclosure relates to storage systems and, more specifically, to caching and logging of data, including metadata, in non-volatile random access memory (NVRAM) of a storage system.

2. Background Information

A storage system typically includes one or more storage devices, such as solid state drives (SSDs) embodied as flash storage devices, into which information may be entered, and from which the information may be obtained, as desired. The storage system may logically organize the information stored on the devices as storage containers, such as files or logical units (LUNs). Each storage container may be implemented as a set of data structures, such as data blocks that store data for the storage containers and metadata blocks that describe the data of the storage containers. For example, the metadata may describe, e.g., identify, storage locations on the devices for the data.

Some types of SSDs, especially those with NAND flash components, move data among those components at the granularity of a page, e.g., 8 KB. In contrast, the size and alignment of writes from a storage system to SSDs may need to be more flexible in order to maximize capacity and media wear efficiency, for example to accommodate misaligned write accesses, to allow for data compression to arbitrary sizes, or to incorporate a small amount of storage system metadata contiguous with the data. Additionally, deferred processing of write requests may be advantageous in order to improve performance and wear efficiency, e.g., batching writes to improve Redundant Array of Independent Disk (RAID) efficiency, or evaluating opportunities for data deduplication. Thus, fast and efficient acknowledgement of the I/O requests by the storage system prior to writing data to SSDs is desirable so as to reduce latency from the perspective of a host.

However, data associated with an I/O request may be lost when power is interrupted on the storage system. This is particularly problematic when the I/O request, e.g., a write request, from the host has been acknowledged by the storage system and write data associated with the request has been sent to the one or more storage devices prior to a power loss, i.e., the storage device has buffered the data but power is interrupted prior to permanent storage on the device. Enterprise grade SSDs may include a feature that permits some or all of the buffered data to be stored to its flash storage device components even when power fails, e.g., by providing internal capacitors or batteries. But lower cost consumer grade SSDs have no such feature, so that data may be lost when power fails. Thus, there is a need to provide low latency for I/O requests to a storage system using low cost storage while avoiding data loss.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

The embodiments described herein provide non-volatile random access memory (NVRAM) caching and logging configured to deliver low latency acknowledgements of input/output (I/O) requests, such as write requests, while avoiding loss of data associated with the requests that may occur as a result of power failures. Write data associated with one or more write requests may be received at a storage system, which is illustratively embodied as a node of a cluster. The write data may be stored in a portion of an NVRAM configured as, e.g., a persistent write-back cache of the node, while parameters of the request may be stored in another portion of the NVRAM configured as a log, e.g., a NVLog. The write data may be organized into separate variable length blocks or extents and "written back" out-of-order from the write-back cache to storage devices, such as solid state drives (SSDs). Illustratively, the storage devices may be consumer grade SSDs serviced by other nodes in the cluster. The write data may be preserved in the persistent write-back cache until each extent is safely and successfully stored on SSD (i.e., in the event of power loss), or operations associated with the write request are sufficiently logged on NVLog, to thereby provide efficient recovery when attempting to restore the write data preserved in the cache to the SSDs.

DESCRIPTION

Storage Cluster

Figure 1:
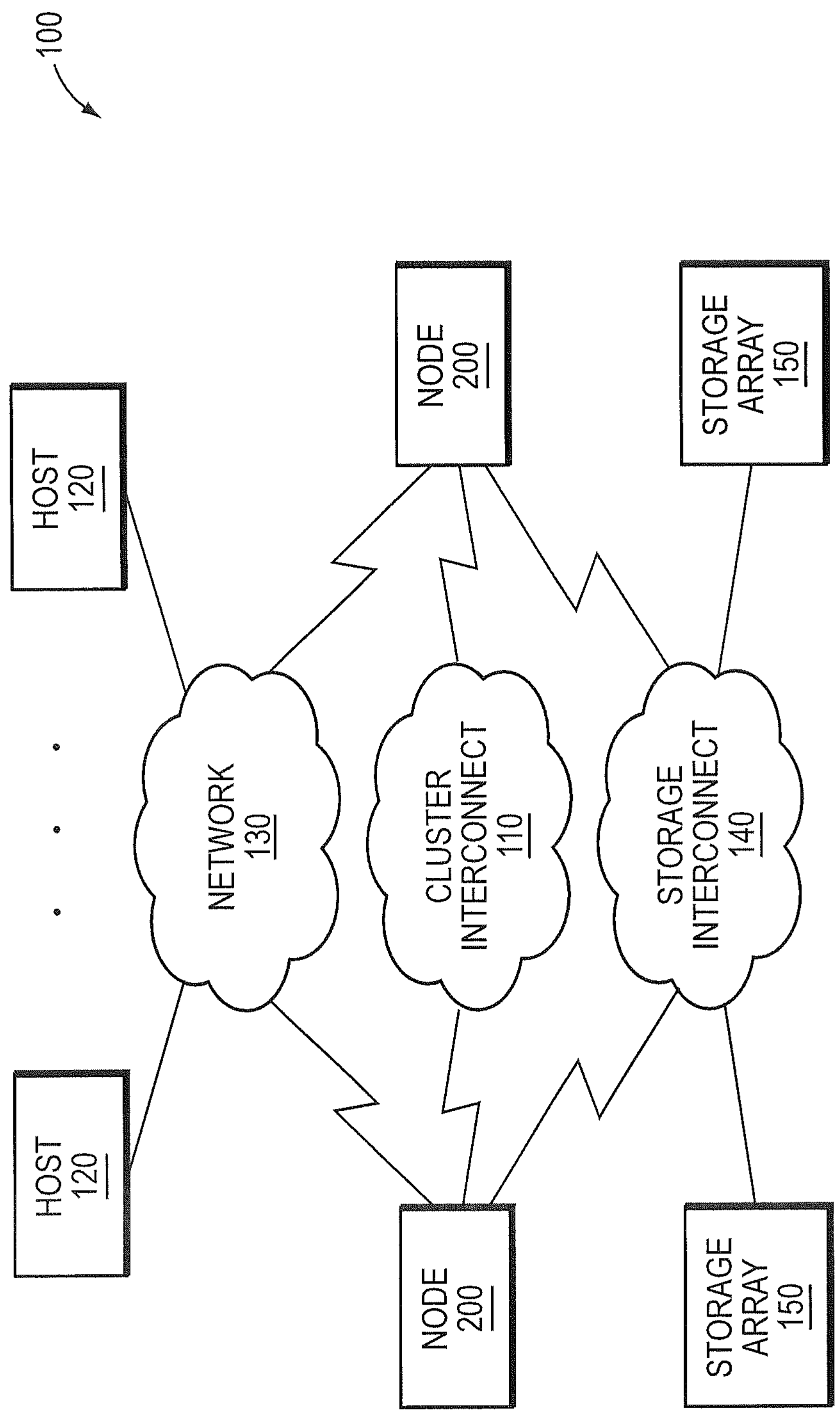
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
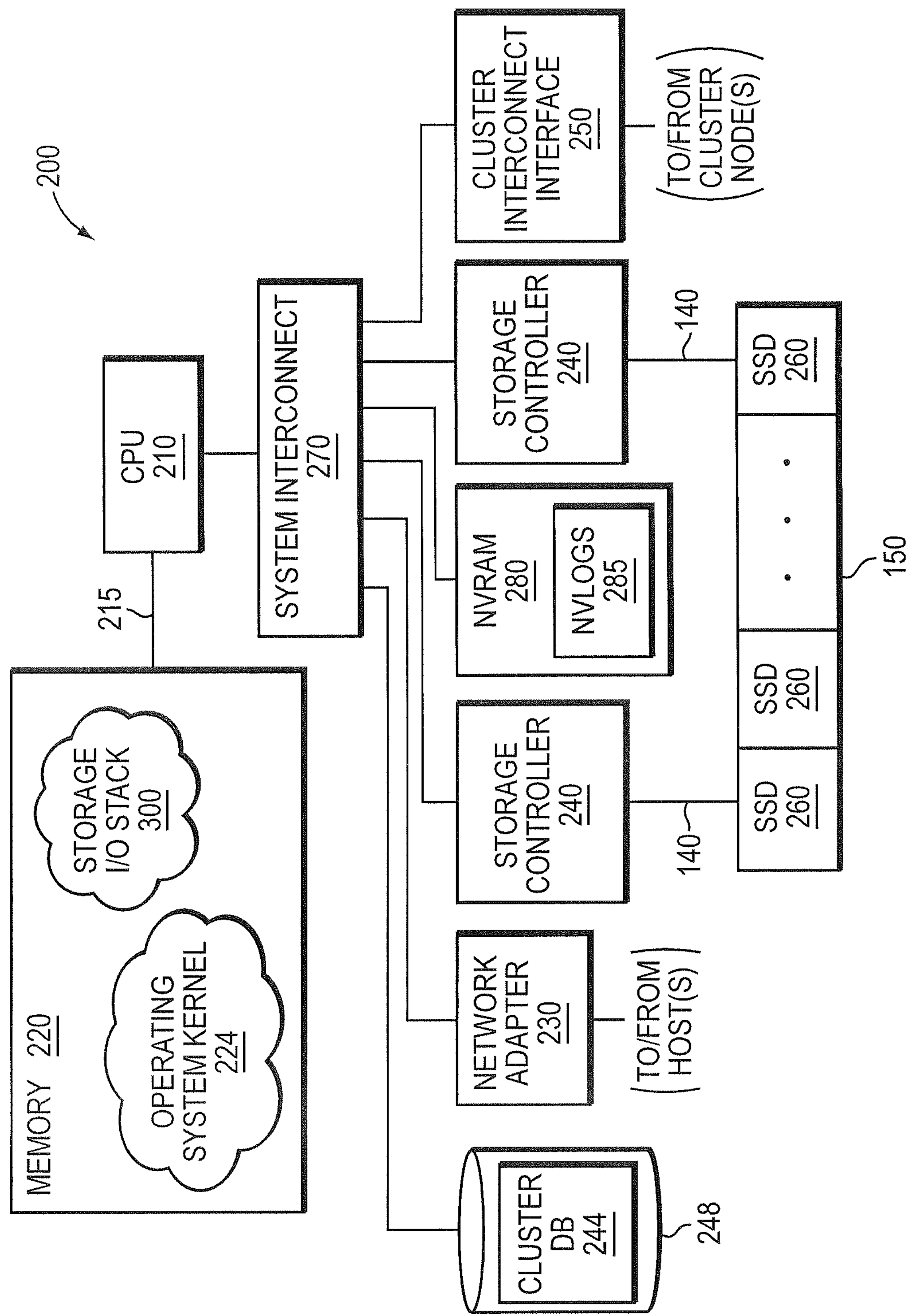
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD configured to locally store cluster-related configuration information, e.g., as cluster database (DB) 244, which may be replicated to other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
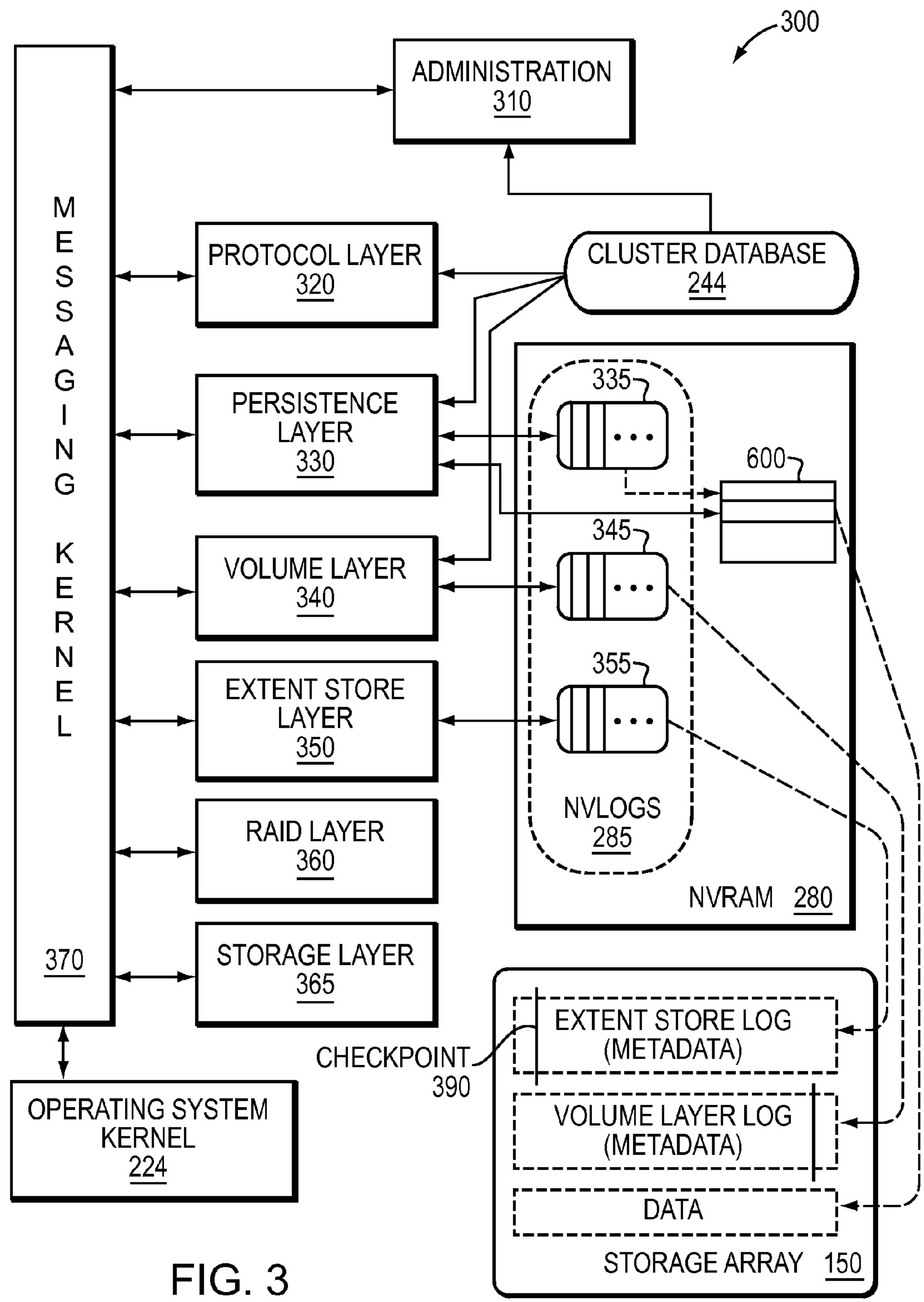
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and e.g., for inter-node communication: messages using a Remote Procedure Call (RPC) mechanism in accordance with a function shipping implementation. Alternatively, the storage I/O stack 300 may be implemented using a thread-based or stack-based execution model without messages. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 600, illustratively embodied as a log whose contents can be replaced randomly, e.g., under some random access replacement policy rather than only in serial fashion, and returns an acknowledgement to the host 120 via the protocol layer 320. In one or more embodiments, only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 600 configured to store the write data associated with the write request. In an embodiment, the write-back cache may be structured as a log. Notably, the write data for the write request may be physically stored in the cache 600 such that the log 335 contains the reference to the associated write data. It will be understood to persons skilled in the art that other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the write data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset range) or set of ranges within the LUN. The protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. Illustratively, an extent is a variable length block of data that provides a unit of storage on the SSDs that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer. Subsequently, the contents of the volume layer log 345 may be written to the storage array 150 in accordance with retirement of log entries, while a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoints with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers 240 and cluster interface 250) cooperating with the operating system kernel 224, such as a Linux virtual function I/O (VFIO) driver.

Write Path

Figure 4:
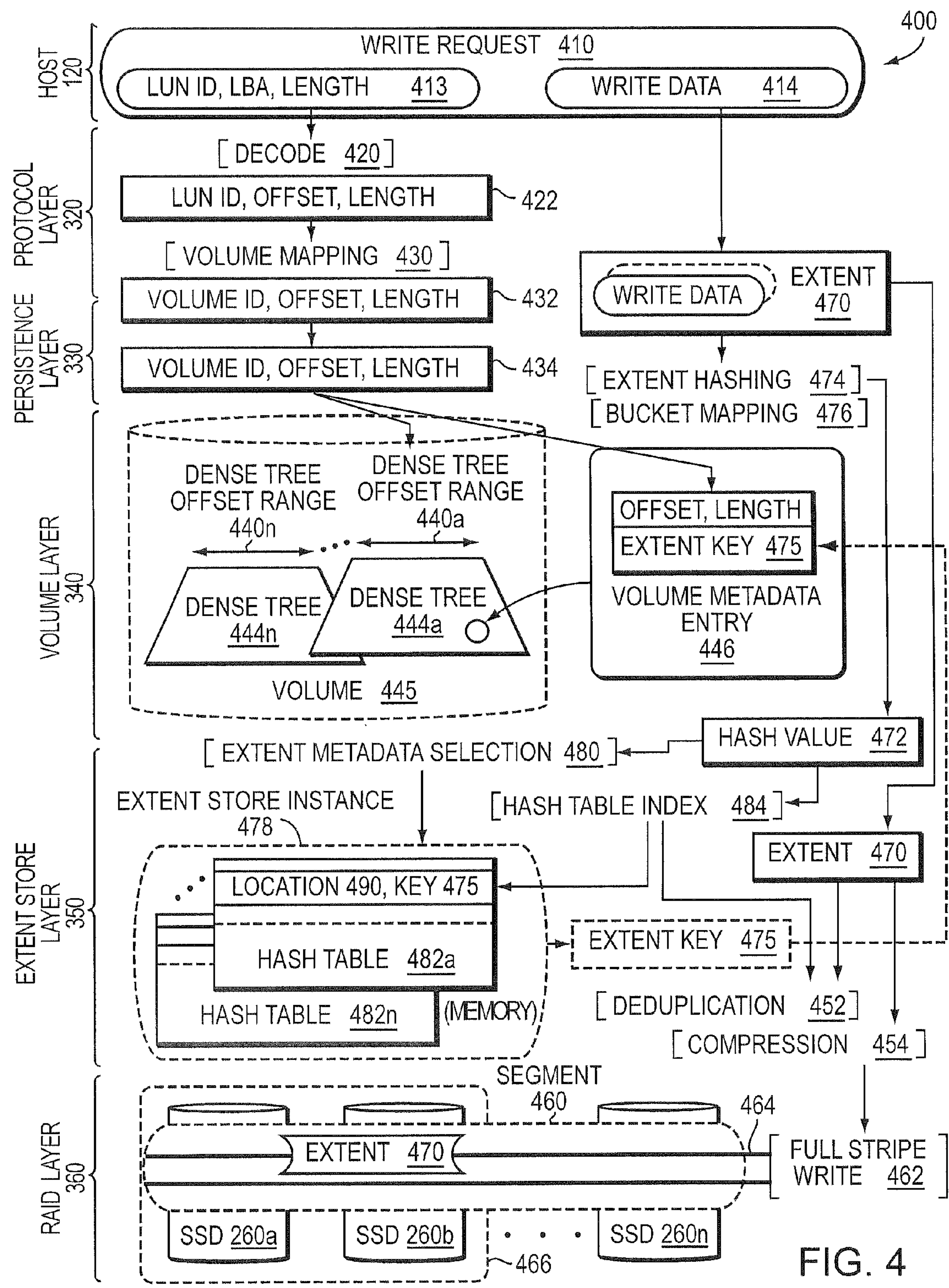
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above-described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 to the appropriate volume layer instance. In an embodiment, message passing of the parameters 432 (received by the persistence layer) may be redirected to another node via the function shipping mechanism, e.g., RPC, for inter-node communication. Alternatively, message passing of the parameters 432 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note, the bucket mapping technique may be implemented in any layer of the storage I/O stack 300 above the extent store layer 350. In an embodiment, for example, the bucket mapping technique may be implemented in the persistence layer 330, the volume layer 340, or a layer that manages cluster-wide information, such as a cluster layer (not shown). The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482*a*) from a set of hash tables (illustratively in-core) within the extent store instance 478, and (ii) extracts a hash table index 484 from the hash value 472 to index into the selected hash table and lookup a table entry having an extent key 475 identifying a storage location 490 on SSD 260 for the extent. Accordingly, the extent store layer 350 may contain computer executable instructions executed by the CPU 210 to perform operations that implement the metadata selection technique 480 described herein. If a table entry with a matching key is found, the SSD location 490 mapped from the extent key 475 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 475 of the existing extent is passed to the appropriate volume layer instance for storage within an entry (denoted as volume metadata entry 446) of a dense tree metadata structure (e.g., dense tree 444*a*), such that the extent key 475 is associated an offset range (e.g., offset range 440*a*) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482*n*) of extent store instance 478 may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260*b* for storing the extent 470.

In an embodiment, the RAID layer 360 then writes the stripes 464 across the RAID group 466, illustratively as a full write stripe 462. The RAID layer 360 may write a series of stripes 464 of sufficient depth to reduce data relocation that may occur within flash-based SSDs 260 (i.e., flash block management). The extent store instance then (i) loads the SSD location 490 of the new extent 470 into the selected hash table 482*n* (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to metadata of the selected hash table in the extent store layer log 355. Illustratively, the volume layer instance selects dense tree 444*a* spanning an offset range 440*a* of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444*a* and records a change corresponding to the volume metadata entry in the volume layer log 345. Accordingly, the I/O (write) request is sufficiently stored on SSD 260 of the cluster.

Read Path

Figure 5:
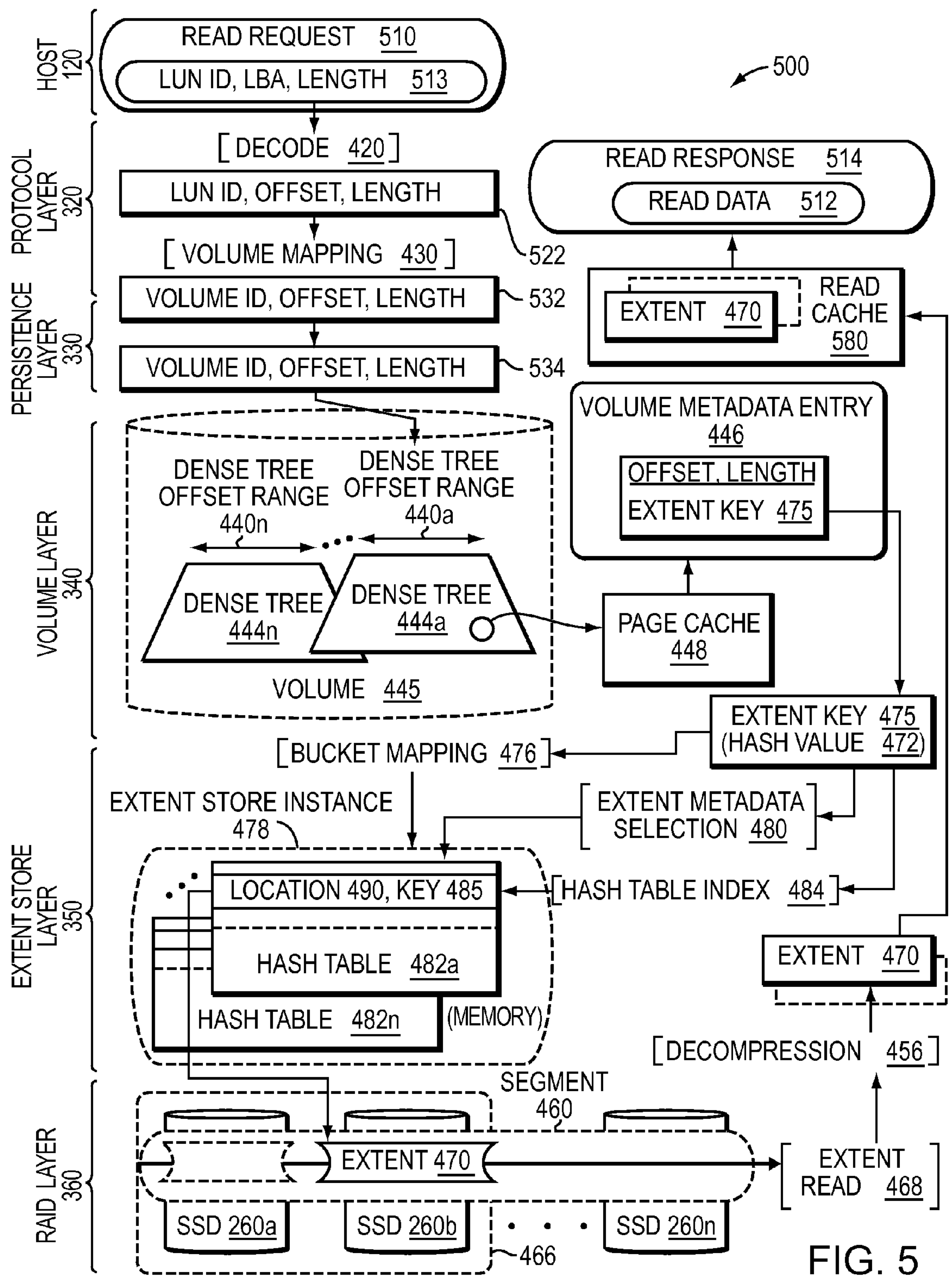
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 600 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure (e.g., dense tree 444*a*) associated with a region (e.g., offset range 440*a*) of a volume 445 that encompasses the requested offset range (specified by parameters 534). The volume layer instance may further process the read request to search for (lookup) one or more volume metadata entries 446 of the dense tree 444*a* to obtain one or more extent keys 475 associated with one or more extents 470 within the requested offset range. Illustratively, each dense tree 444 may be embodied as a-multiple levels of a search structure with possibly overlapping offset range entries at each level. The entries, i.e., volume metadata entries 446, provide mappings from host-accessible LUN addresses, i.e., LBAs (offsets), to durable extent keys. The various levels of the dense tree may have volume metadata entries 446 for the same offset, in which case the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 475 for the entire requested read range are found. If no metadata entries exist for the entire or portions of the requested read range, then the missing portion(s) are zero filled. Once found, each extent key 475 is processed by the volume layer 340 to, e.g., implement the bucket mapping technique 476 that translates the extent key to an appropriate extent store instance 478 responsible for storing the requested extent 470. Note that, in an embodiment, each extent key 475 may be substantially identical to the hash value 472 associated with the extent 470, i.e., the hash value as calculated during the write request for the extent, such that the bucket mapping 476 and extent metadata selection 480 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 475 (i.e., the hash value 472) to perform the extent metadata selection technique 480 that (i) selects an appropriate hash table (e.g., hash table 482*a*) from a set of hash tables within the extent store instance 478, and (ii) extracts a hash table index 484 from the extent key 475 (i.e., the hash value 472) to index into the selected hash table and lookup a table entry having a matching extent key 475 that identifies a storage location 490 on SSD 260 for the extent 470. That is, the SSD location 490 mapped to the extent key 475 may be used to retrieve the existing extent (denoted as extent 470) from SSD 260 (e.g., SSD 260*b*). The extent store instance then cooperates with the RAID layer 360 to access the extent on SSD 260*b* and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Persistent Write-Back Cache

A write request 410 (including write data 414) received at the persistence layer 330 is illustratively stored in the NVRAM 280. Storage of write request 410 (i.e., write parameters 413 and write data 414) in the NVRAM 280 enables immediate, i.e., low latency, acknowledgement to the host 120 of successful receipt and storage of the write data on the cluster 100. The write request 410 may be stored in NVRAM in the form of a log, e.g., dedicated log 335 of NVLogs 285; however, in an embodiment, the write data is illustratively stored in the NVRAM in the form of the persistent write-back cache 600. The write data 414 is thereafter preserved in the cache 600 until written to the storage array 150 (i.e., SSD 260) according to a "write-back" operation (as opposed to a checkpoint).

Illustratively, the write-back cache 600 is configured to write the data back to SSD quickly, primarily because there is no need to achieve read caching or cache hits on subsequent write requests. However, write-back of the write data from the cache 600 to the SSD 260 may occur due to cache pressure or to capture a point-in-time image of a storage container. Nevertheless, a reason for maintaining the write data in the persistent write-back cache 600 for some period of time is that the write data may be part of sequential write requests that are contiguous, i.e., within a continuous LBA range, and thus may be combined into one or more variable length extents 470. The extents (i.e., write data) can then be "written back" to the storage array 150 in any order that is convenient. Preserving such flexibility enables use of the persistent write-back cache 600 to impose a degree of regularity on an incoming stream of write requests 410 received at the storage I/O stack 300. It should be noted that any protocol ordering in the incoming stream may be reflected in the contents of the write-back cache. As a result, out-of-order write back from the write-back cache to SSD is permitted, so long as data in the cache is faithfully preserved.

Figure 6:
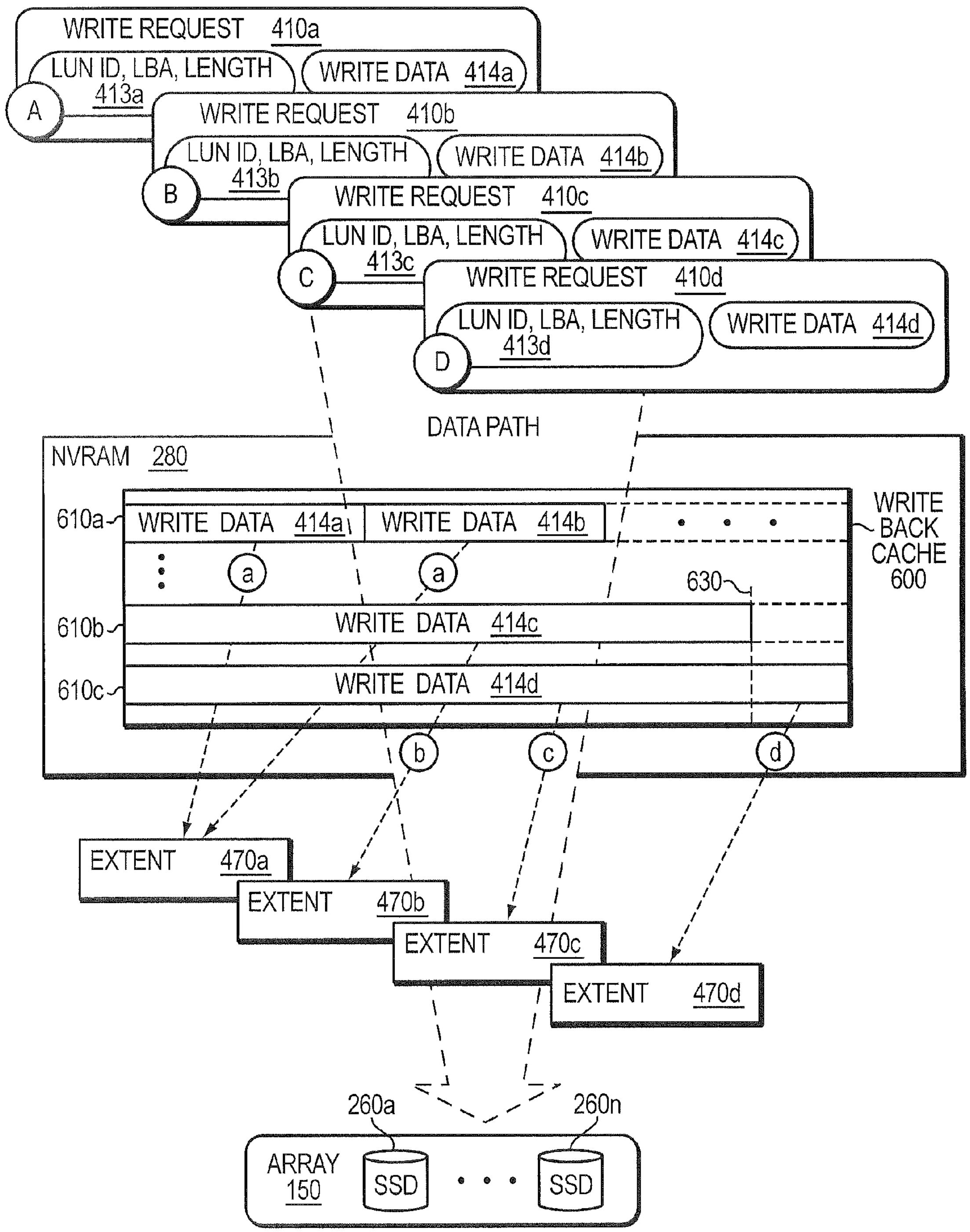
FIG. 6 is a block diagram of a persistent write-back cache of the storage I/O stack.

FIG. 6 is a block diagram of the persistent write-back cache 600 of the storage I/O stack 300 that may be advantageously used with one or more embodiments described herein. The write-back cache 600 illustratively includes a plurality of entries, i.e., cache lines 610*a-c*, configured to store write data 414*a-d* of write requests 410*a-d*. For example, assume the write requests are associated with an incoming stream of odd-sized, sequential write requests 410*a-d* that manifest as two 512 byte write requests (e.g., write data 414*a*, 414*b* of write requests 410*a*, 410*b*), followed by a 16 KB write request (e.g., write data 414*c* of write request 410*c*) and a 256 KB write request (e.g., write data 414*d* of write request 410*d*). The persistent write-back cache 600 may store the write data in cache lines 610*a-c* prior to collecting and organizing the data into more regularly aligned, e.g., on 16 KB boundaries, extents 470*a-d* of write data that are thereafter written to SSD 260. Illustratively, an extent 470*a* may be formed by combining the write data, e.g., 414*a* and 414*b*, from write requests 410*a* and 410*b*, whereas an extent 470*b* may be formed from the write data 414*c* of write request 410*c*. Additionally, the write data 414*d* from write request 410*d* may be split into two or more extents 470*c* and 470*d*, e.g., based on a maximum extent size 630. The extents 470*a-d* may then be written back to the storage array 150 in any convenient order. Notably, the extents (write data) are not retired, e.g., evicted or deleted, from the cache 600 until the write data is safely stored on the array. Accordingly, a property of the persistent write-back cache 600 of the storage I/O stack 300 is that write data is generally not retired from the cache until the persistence layer 330 receives confirmation (e.g., from the extent store layer 350) that the write data (extent) is successfully stored on SSD 260 of the storage array.

Advantageously, use of the persistent write-back cache 600 within the storage I/O stack 300 enables flexibility of how the data is written back to SSD 260, as opposed to a log which typically compels write-back in approximately the same order in which the write requests were received. For example, if the write data 414*a-d* were stored in the persistence layer log 335, the persistence layer 330 may be compelled to "write-back", i.e., push or copy, the write data to the volume layer 340 in approximately the same order in which the write requests were received to allow reuse of the log space. This is because log space is typically allocated, filled, checkpointed and freed sequentially, whereas lines within the persistent write-back cache 600 may be allocated, filled, written-back, and freed in any pattern (i.e., order) convenient to the storage system.

Atomicity of Data

In one or more embodiments, the persistence layer 330 may cooperate with the NVRAM 280 to provide atomicity for write data, e.g., write data 414*a-d*, that could be fragmented into multiple extents and stored across different boundaries of logical constituents of a LUN, e.g., volumes, regions, and/or stripes. If the write data could cross one of the logical boundaries, it may be desirable to provide atomicity for that data without having synchronization among instances of the volume layer 340 and instances of other layers (e.g., the extent store layer 350) representing those different constituents. For example, each extent storage operation may follow a write path (i.e., its extent store layer "put" operation and associated volume layer offset range operation) that is independent from the path followed by other layer operations. The persistence layer 330 may provide such an atomic function, i.e., as viewed by the host 120, by hiding those boundaries and enabling atomicity in spite of the fact that there is no coordination among the different constituents of the LUN, e.g., instances of lower layers of the storage I/O stack 300.

More generally, if write data 414 could be fragmented at lower layers of the storage I/O stack (e.g., RAID layer 360, extent store layer 350 or volume layer 340) and it is desirable to preserve atomicity for some portion (i.e., atomic units) of the data, the NVRAM 280 facilitates such preservation, e.g., via write-back cache 600 of the persistence layer by allowing the atomic units to commit into NVRAM rather than having to implement a type of two-phase commit of lower-level portions of the data that constitute the atomic units. That is, persistent caching and logging (e.g., via NVRAM 280 and NVLogs 285) of operations at the persistence layer obviates synchronization of lower-level operations, allowing simplification and a greater degree of parallelism among instances of lower layers of the storage I/O stack 300.

For example, assume a write request 410 that changes a database block of a LUN arrives at the node 200 at an arbitrary alignment with respect to, e.g., a database requirement for write atomicity. In typical deployments, the database block may be sized between 4 KB and 64 KB but, in general, is power of 2 in size (any arbitrary 512 byte alignment boundary may be chosen). Assume further that write data 414 of the write request forms one or more 64 KB extents, each of which is to be processed atomically. If, for example, 192 KB of write data is received at the node, the write data could include three 64 KB blocks or a series of 4 KB blocks. Regardless of its size, if the write data includes uniform-sized database blocks of a power of 2 size no greater than 64 KB, and if atomicity is maintained for each 64 KB portion of the write data, it can be ensured that every database block within the write data is also written atomically, i.e., all or nothing, within a subunit (64 KB portion) of the write data. That is, if the write data is multiple megabytes in length, the atomic guarantee only extends to each "64 KB-aligned-modulo-at-the-beginning-of-the-write-data" portion of data. Accordingly, the alignment requirement commences from the beginning of the write request and not from the beginning the LUN. By atomically writing 64 KB portions into the NVRAM 280 maintained by the persistence layer 330, e.g., into the persistent write-back cache 600, fragments of those portions can be written back to the underlying volumes at different times without any coordinated atomic push-back among the volumes (i.e., because the portions are individually preserved in the persistent write-back cache). As long as the portions are atomically stored when recorded by the persistence layer 330, the atomicity requirement can be achieved.

NVRAM Logging

Figure 7:
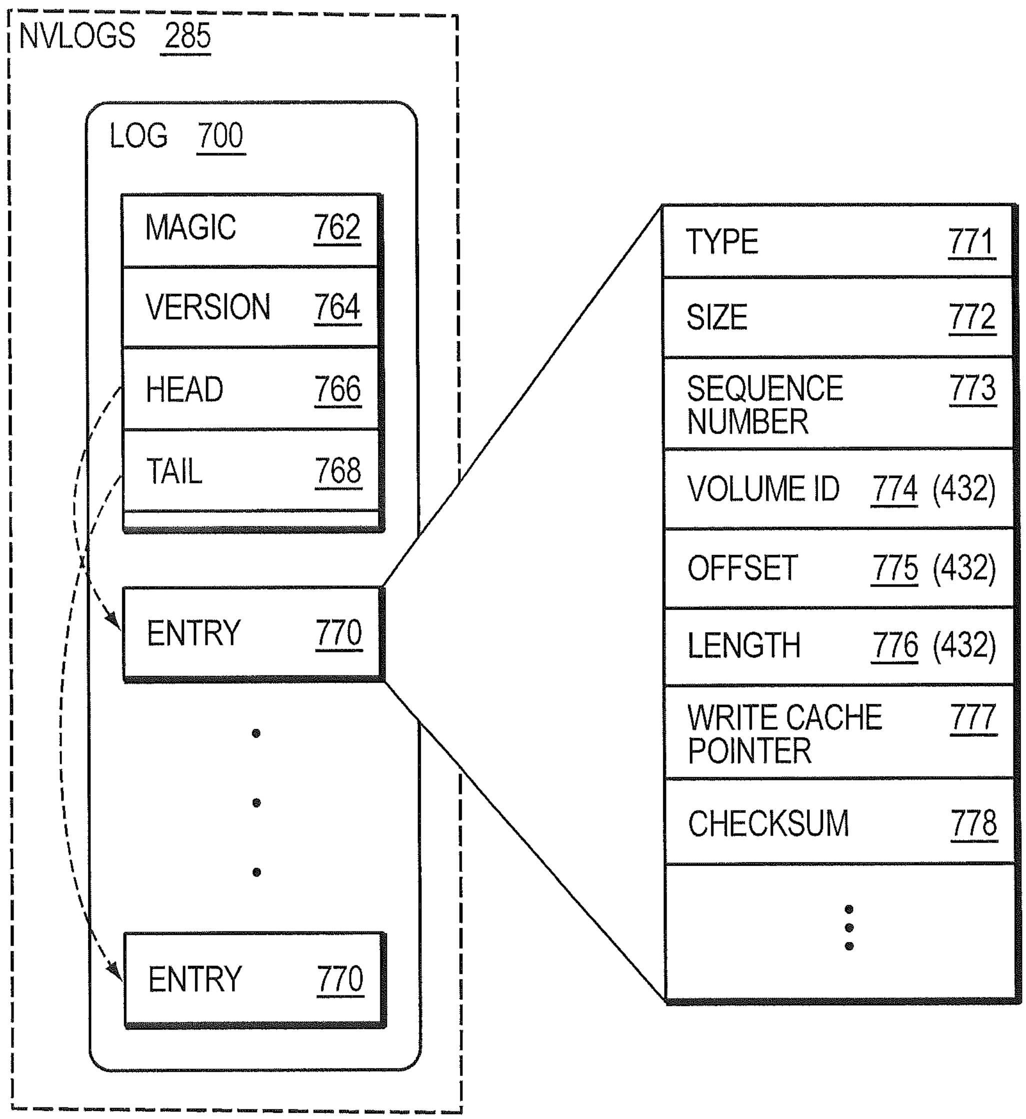
FIG. 7 is a block diagram of a non-volatile random access memory (NVRAM) log of the storage I/O stack.

In addition to providing atomicity of write data, the persistence layer 330 may cooperate with the NVRAM 280 to hide latencies associated with underlying operations (e.g., data and metadata path operations) within the storage I/O stack 300. To that end, the persistence layer 330 may cooperate with the NVRAM to employ a log for recording an I/O request 410 issued by the host 120. FIG. 7 is a block diagram of an NVRAM log 700 that may be advantageously used with one or more embodiments described herein. Illustratively, the NVRAM log 700 may be a dedicated log of the NVLogs 285 and, thus, provides an exemplary embodiment of the persistence layer log 335, the volume layer log 345 and/or the extent storage layer log 355. In an embodiment, the dedicated NVRAM log 700 is illustratively configured as a circular log of records or entries 770 and includes a magic number 762 that ensures the correctness (validity) of the log, a version 764 that identifies a version of the log, a head (pointer) 766 configured to point to (reference) a head entry at a beginning of the circular log and a tail (pointer) 768 configured to reference a tail entry at an end of the circular log.

Each entry 770 may further include, inter alia, a type 771 of I/O request (e.g. write request), a size 772 of the entry and a sequence number 773. Illustratively, the sequence number 773 (e.g., a monotonically increasing value) facilitates matching of entries within the log 700 to allow retirement of the entries when all write data associated with the request is safely stored on the storage array 150. Thus, the sequence number 773 may be a time-stamp or other value that is advantageously employed when the write data is split into multiple extents 470 and written to the storage array out-of-order. For example, a log entry 770 may be retired when all extents associated with the write data 414 of the write request 410 have been successfully stored on SSD 260 of the array 150. The entry 770 may also include a volume ID 774 that identifies a volume destined for the request (and a node servicing the volume), as well as I/O request parameters 432 such as offset 775 (i.e., LBA) and length 776 (i.e., write data length). In the case of the persistence layer log 335, a write cache pointer 777 is provided to reference the write data 414 stored in the write-back cache 600. Alternatively, the log 700 may contain the write data, such that the log subsumes the write-back cache 600. A checksum 778 may also be provided to ensure that the information of the entry is stored without error.

In one or more embodiments, the volume layer 340 and extent store layer 350 may employ the NVRAM 280 to optimize both (i) latency of metadata changes (updates), as well as (ii) write amplification costs associated with the metadata updates. That is, the extent store layer 350 may use its dedicated log 355 of the NVLogs 285 to record metadata updates to hash table 482, whereas the volume layer 350 may use its dedicated log 345 of the NVLogs 285 to record volume metadata updates to the dense tree 444 (via volume metadata entry 446).

Specifically, the volume layer 340 may record write requests (i.e., parameters 432, such as offset and length, along with extent key 475) on the dense tree 444. The recorded metadata may be checkpointed by a merge operation from the in-core dense tree metadata structure to a corresponding dense tree metadata structure on SSD (on-flash). Updates to the in-core dense tree 444 may also be logged onto the dedicated log 345 of NVLogs 285 and then pushed (written) to SSD as the log fills. Writing of the log entries to SSD 260 may be effected by a change log operation, i.e., copying operation, that records insertions and deletions performed on the in-core dense tree 444. Such log writing may be separate and different from a merge operation between the in-core mappings and on-flash mappings of the dense tree, which is a checkpoint. Accordingly, once the merge (checkpoint) of the in-core dense tree 444 is performed, the entries of the dedicated log 345 may be retired (e.g., deleted, marked reusable, or a marker written to the log expiring previous entries) because they have been merged onto SSD 260.

Similarly, the extent store layer 350 records updates to the in-core hash tables 482 in the dedicated log 355. Subsequently, those in-core mappings, i.e., hash tables, may be written to the storage array 150 in accordance with the fuzzy checkpoint 390 in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed and then, illustratively, for those entries prior to the first interval.

Accordingly, a metadata path through the storage I/O stack 300 involves storage of metadata in entries 770 of the dedicated logs, as well as checkpoints of in-core mappings, i.e., entries of hash tables 482 of the extent store layer 350 and entries of dense trees 444 of the volume layer 340. In addition, a data path through the storage I/O stack 300 involves storage of write data in the persistence write-back cache 600, where the write data is organized as one or more extents 470 and provided, e.g., via a memory reference such as a pointer or data message, to the extent store layer 350 and to the RAID layer 360, where each extent 470 is safely stored on SSD 260.

Power Loss Resilient Paths

Figure 8:
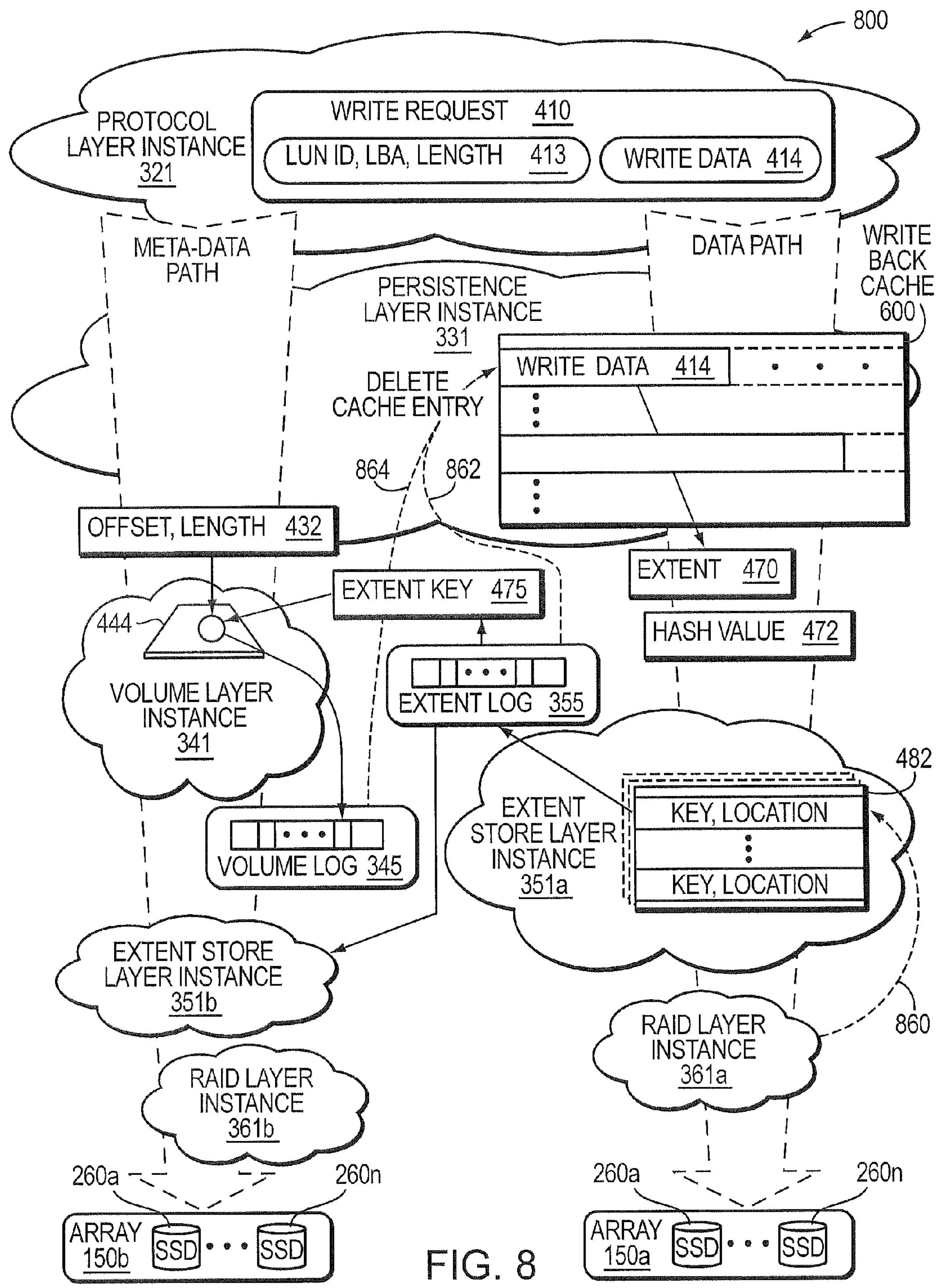
FIG. 8 illustrates data and metadata paths of the storage I/O stack.

FIG. 8 illustrates data and metadata paths 800 of the storage I/O stack 300. In an embodiment, write data 414 of write request 410 is stored in the persistent write-back cache 600 by a persistence layer instance 331. The write data is then formed into an extent 470 (and a hash value 472) and passed to an extent store layer instance 351*a* for storage on the array 150. As described previously, the extent store instance processes the hash value 472 to index into a hash table 482 to either determine an existing table entry (e.g., a possible de-duplication opportunity) or a free entry. Illustratively, if no de-duplication opportunity exists (or the hash value indexes to a free entry), the extent 470 (i.e., write data 414) is passed to a RAID layer instance 361*a* within a full stripe write 462, and the RAID layer instance subsequently reports completion of the write, e.g., via return parameters or callback 860, to the extent store layer instance 351*a* (i.e., extent store instance). The extent store instance may then load the extent location into a field of an entry of the hash table 482 (LOCATION 490) and record the table entry in the dedicated extent log 355.

Subsequently, the extent store layer instance 351*a* may issue a callback 862 to the persistence layer instance 331, which may use the callback to "complete", e.g. delete, evict or mark removable, the write data 414 from the persistent write-back cache 600. At that point, the write data 414 of extent 470 has been provided to the SSD 260 of the storage array 150*a* and has been acknowledged either as stored on flash components of the SSD 260 or stored in a non-volatile buffer within the SSD.

Alternatively, the persistent layer instance 331 may wait until an appropriate volume layer instance 341 has inserted (committed) the extent key 475 and write parameters 432 (e.g., offset and length) into the dense tree 444 and recorded that volume metadata in the dedicated volume layer log 345. Notably, the volume metadata is not written into the volume layer 340 that resolves the extent 470 for holding the write data until the extent is actually at the SSD 260. That is, the volume layer instance 341 may not store any useful metadata until it is provided the extent key 475 for the extent 470, and the extent store layer instance 351 does not provide the volume layer instance with the extent key 475 until it has resolved a potential de-duplication opportunity. Once the extent key 475 and write parameters 432 are committed into the dense tree 444, the volume layer instance 341 may issue a callback 864 to the persistence layer instance 331 informing that instance that the write request 410 is "complete."

In an embodiment, the dedicated logs 345 and 355 may be stored on a different storage array 150*b* via a different extent storage layer instance 351*b* from that used to store the write data 414 of extent 470, i.e., storage array 150*a* via extent store instance 351*a*. In other words, the path for (write) data may differ from the path for metadata. Nevertheless, even if appropriate log entries in the dedicated logs 345 and 355 are not immediately stored on the flash components of the SSD 260 (or power is lost) the log entries are preserved in NVRAM 280, e.g., in NVlogs 285. Similarly, the write data 414 of the extent 470 is preserved in NVRAM 280, e.g., in persistent write-back cache 600. Thus, the preserved write data and metadata may be replayed to recover failure of either storage array 150*a* or 150*b* (e.g. power loss to the SSD 260) to enable successful storage of the write data (and/or metadata) to the flash components of their respective SSDs. Correspondingly, there is no particular motive to quickly write the extent 470 (write data 414) from the persistent write-back cache 600 to SSD, provided there is sufficient storage capacity in the write-back cache 600 to accommodate the write data awaiting storage on SSD. As a result, disjoint operations between instances of layers of the storage I/O stack 300 may be performed in parallel.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:

a central processing unit (CPU) of a node coupled to one or more solid state drives (SSDs);

a memory coupled to the CPU and configured to store a storage input/output (I/O) stack having a plurality of layers executable by the CPU, the layers including a persistence layer; and a non-volatile random access memory (NVRAM) coupled to the CPU, a portion of the NVRAM configured as a write-back cache to store write data associated with one or more write requests, the persistence layer configured to organize the write data into extents that are written back to the one or more SSDs in any order, the write data preserved in the write-back cache until each extent is safely and successfully stored on the one or more SSDs in an event of a power loss.

2. The system of claim 1 wherein the persistence layer is further configured to provide persistent caching of operations for the NVRAM.

3. The system of claim 2 wherein the one or more write requests are sequential write requests, and wherein the persistence layer maintains the write data of the sequential write requests in the write-back cache for a period of time to combine the write data into one or more of the extents.

4. The system of claim 2 wherein the any order comprises out-of-order write back from the write-back cache to the one or more SSDs as long as the write data is preserved in the write-back cache.

5. The system of claim 2 wherein the persistence layer is further configured to cooperate with the NVRAM to provide atomicity for write data capable of fragmentation at one or more layers of the storage I/O stack.

6. The system of claim 2 wherein the persistent caching of operations at the persistence layer obviates synchronization of lower-level operations to allow parallelism among one or more layers of the storage I/O stack.

7. A method comprising:

executing, by a node coupled to one or more solid state drives (SSDs), a storage input/output (I/O) stack having a plurality of layers;

storing, in a non-volatile random access memory (NVRAM) configured as a write-back cache, write data associated with one or more write requests;

organizing, by the node, the write data into extents; and writing, by the node, the extents back to the one or more SSDs in any order, wherein the write data is preserved in the write-back cache until each extent is safely and successfully stored on the one or more SSDs in an event of a power loss.

8. The method of claim 7 further comprising providing persistent caching of operations for the NVRAM.

9. The method of claim 8 wherein the one or more write requests are sequential write requests, and the method further comprises:

maintaining the write data of the sequential write requests in the write-back cache for a period of time to combine the write data into one or more of the extents.

10. The method of claim 8 wherein the any order comprises out-of-order write back from the write-back cache to the one or more SSDs as long as the write data is preserved in the write-back cache.

11. The method of claim 8 further comprising:

providing atomicity for write data capable of fragmentation at one or more layers of the storage I/O stack.

12. The method of claim 8 wherein the persistent caching of operations obviates synchronization of lower-level operations to allow parallelism among one or more layers of the storage I/O stack.

13. A non-transitory computer readable medium including program instructions for execution on one or more processors, the program instructions when executed operable to:

implement a storage input/output (I/O) stack having a plurality of layers that operate with one or more solid state drives (SSDs);

store, in a non-volatile random access memory (NVRAM) configured as a write-back cache, write data associated with one or more write requests;

organize the write data into extents; and write the extents back to the one or more SSDs in any order, wherein the write data is preserved in the write-back cache until each extent is safely and successfully stored on the one or more SSDs in an event of a power loss.

14. The non-transitory computer readable medium of claim 13 wherein the program instructions when executed are further operable to provide persistent caching of operations for the NVRAM.

15. The non-transitory computer readable medium of claim 14 wherein the one or more write requests are sequential write requests, and the program instructions when executed are further operable to maintain the write data of the sequential write requests in the write-back cache for a period of time to combine the write data into one or more of the extents.

16. The non-transitory computer readable medium of claim 14 wherein the any order comprises out-of-order write back from the write-back cache to the one or more SSDs as long as the write data is preserved in the write-back cache.

17. The non-transitory computer readable medium of claim 14 wherein the program instructions when executed are further operable to provide atomicity for write data capable of fragmentation at one or more layers of the storage I/O stack.

18. The non-transitory computer readable medium of claim 14 wherein the persistent caching of operations obviates synchronization of lower-level operations to allow parallelism among one or more layers of the storage I/O stack.

* * * * *